(12) United States Patent
Nagwanshi et al.

(10) Patent No.: US 8,864,216 B2
(45) Date of Patent: Oct. 21, 2014

(54) REINFORCED BODY IN WHITE AND METHOD OF MAKING AND USING THE SAME

(71) Applicant: SABIC Innovative Plastics IP B.V., Bergen op Zoom (NL)

(72) Inventors: Dhanendra Kumar Nagwanshi, Wixom, MI (US); Arunachala Parameshwara, Bangalore (IN); Somasekhar Bobba, Bangalore (IN); Sudhakar Ramamoorthy Marur, Bangalore (IN); Matthew D. Marks, Waterford, MI (US)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/745,208

(22) Filed: Jan. 18, 2013

(65) Prior Publication Data

US 2014/0203592 A1    Jul. 24, 2014

(51) Int. Cl.
*B60N 99/00* (2006.01)
*B60R 19/03* (2006.01)
*B62D 25/00* (2006.01)

(52) U.S. Cl.
CPC ............... *B62D 25/00* (2013.01); *B60R 19/03* (2013.01)
USPC ............................. 296/187.03; 296/187.01

(58) Field of Classification Search
USPC ............ 296/187.01, 187.03, 203.01, 187.08, 296/187.09, 187.12, 193.06, 203.03, 205, 296/204, 209; 293/132, 133, 135, 102, 120; 280/784; 188/377
See application file for complete search history.

(56) References Cited

U.S. PATENT DOCUMENTS

| | | |
|---|---|---|
| 3,162,745 A | 12/1964 | Rohr |
| 3,633,934 A | 1/1972 | Wilfert |
| 3,842,944 A | 10/1974 | Shiotani et al. |
| 4,227,593 A | 10/1980 | Bricmont et al. |
| 4,890,877 A | 1/1990 | Ashtiani-Zarandi et al. |
| 5,139,297 A | 8/1992 | Carpenter et al. |
| 5,150,935 A | 9/1992 | Glance et al. |
| 5,306,066 A | 4/1994 | Saathoff |

(Continued)

FOREIGN PATENT DOCUMENTS

| | | |
|---|---|---|
| DE | 102007038087 A1 | 2/2009 |
| DE | 102011104368 A1 | 3/2012 |

(Continued)

OTHER PUBLICATIONS

Japanese Patent No. 09020267 (A); Publication Date: Jul. 21, 1997; Abstract Only; 1 Page.

(Continued)

*Primary Examiner* — Joseph D Pape
*Assistant Examiner* — Dana Ivey
(74) *Attorney, Agent, or Firm* — Cantor Colburn LLP

(57) ABSTRACT

A structural body of a vehicle can comprises: a hollow metal component comprising walls that define a channel, wherein the metal component has a metal component length, and wherein the metal component is selected from the group consisting of beam, rail, pillar, chassis, floor rocker, and cross-bar, combinations comprising at least one of the foregoing; and a plastic-metal hybrid reinforcement having a cavities therethrough, and a metal support having greater than or equal to 3 walls forming a support channel. The plastic element is located in the support channel wherein the reinforcement is located in the component channel.

19 Claims, 10 Drawing Sheets

(56) References Cited

U.S. PATENT DOCUMENTS

| | | |
|---|---|---|
| 5,480,729 A | 1/1996 | Hattori et al. |
| 5,618,074 A | 4/1997 | Weast |
| 5,715,917 A | 2/1998 | Smallwood |
| 5,746,419 A | 5/1998 | McFadden et al. |
| 5,819,408 A | 10/1998 | Catlin |
| 6,299,958 B1 | 10/2001 | St. Julien et al. |
| 6,394,512 B1 | 5/2002 | Schuster et al. |
| 6,467,822 B1 | 10/2002 | Leng |
| 6,494,510 B2 | 12/2002 | Okamura et al. |
| 6,503,585 B1 | 1/2003 | Wagenblast et al. |
| 6,513,843 B1 | 2/2003 | Frederick et al. |
| 6,540,275 B1 | 4/2003 | Iwamoto et al. |
| 6,547,295 B2 | 4/2003 | Vismara |
| 6,685,243 B1 | 2/2004 | Evans |
| 6,866,294 B2 | 3/2005 | Horsch et al. |
| 6,866,331 B2 | 3/2005 | Kropfeld |
| 6,938,936 B2 | 9/2005 | Mooijman et al. |
| 7,004,502 B2 | 2/2006 | Borroni-Bird et al. |
| 7,044,514 B2 | 5/2006 | Mustafa et al. |
| 7,086,690 B2 | 8/2006 | Shuler et al. |
| 7,134,700 B2 | 11/2006 | Evans |
| 7,163,243 B2 | 1/2007 | Evans |
| 7,222,896 B2 | 5/2007 | Evans |
| 7,434,872 B2 | 10/2008 | Steller |
| 7,517,006 B2 | 4/2009 | Kageyama et al. |
| 7,520,561 B2 | 4/2009 | Nakamae et al. |
| 7,597,383 B2 | 10/2009 | Itou et al. |
| 7,607,720 B2 | 10/2009 | Noyori et al. |
| 7,699,383 B2 | 4/2010 | Fukukawa et al. |
| 7,806,448 B2 | 10/2010 | Allen et al. |
| 7,879,435 B2 | 2/2011 | Mett et al. |
| 8,322,780 B2 * | 12/2012 | Nagwanshi et al. ..... 296/187.03 |
| 8,469,417 B2 | 6/2013 | Di Modugno |
| 8,474,583 B2 | 7/2013 | Nagwanshi et al. |
| 2001/0026072 A1 | 10/2001 | Sato et al. |
| 2002/0017805 A1 | 2/2002 | Carroll, III et al. |
| 2002/0043809 A1 | 4/2002 | Vismara |
| 2002/0050413 A1 | 5/2002 | Renault |
| 2002/0070584 A1 | 6/2002 | Carroll, III et al. |
| 2002/0125725 A1 | 9/2002 | Satou |
| 2002/0129981 A1 | 9/2002 | Satou |
| 2002/0180223 A1 | 12/2002 | Vismara et al. |
| 2003/0034658 A1 | 2/2003 | Cate et al. |
| 2003/0067179 A1 | 4/2003 | Bastien et al. |
| 2003/0164618 A1 | 9/2003 | Gentle |
| 2004/0051321 A1 | 3/2004 | Hanai et al. |
| 2004/0124643 A1 | 7/2004 | Matsumoto et al. |
| 2004/0174025 A1 | 9/2004 | Converse et al. |
| 2006/0119116 A1 | 6/2006 | Goertz |
| 2006/0181089 A1 | 8/2006 | Andre et al. |
| 2008/0048462 A1 | 2/2008 | Zabik |
| 2008/0246277 A1 | 10/2008 | Gallagher et al. |
| 2008/0286522 A1 | 11/2008 | Khan et al. |
| 2009/0160203 A1 | 6/2009 | Garg et al. |
| 2009/0309387 A1 | 12/2009 | Goral et al. |
| 2010/0244472 A1 | 9/2010 | Gonin et al. |
| 2012/0112479 A1 | 5/2012 | Nagwanshi et al. |
| 2012/0153669 A1* | 6/2012 | Nagwanshi et al. ..... 296/187.08 |

FOREIGN PATENT DOCUMENTS

| | | |
|---|---|---|
| EP | 0661198 A1 | 7/1995 |
| EP | 1065108 A2 | 1/2001 |
| EP | 1369309 A1 | 12/2003 |
| EP | 1419936 A1 | 5/2004 |
| EP | 1300293 B1 | 12/2004 |
| EP | 1652733 A1 | 5/2006 |
| EP | 1759959 A2 | 3/2007 |
| EP | 2380782 A1 | 10/2011 |
| FR | 2702432 A1 | 9/1994 |
| FR | 1473197 A1 | 11/2004 |
| FR | 2859970 A1 | 3/2005 |
| FR | 2864811 A1 | 7/2005 |
| FR | 2887508 A1 | 12/2006 |
| GB | 2384217 A | 7/2003 |
| JP | 09020267 A | 1/1997 |
| JP | 2006247237 A | 9/2006 |
| WO | 2005100100 A1 | 10/2005 |
| WO | 2005105554 A1 | 11/2005 |
| WO | 2006065868 A2 | 6/2006 |
| WO | 2006119225 A2 | 11/2006 |
| WO | 2006136743 A1 | 12/2006 |
| WO | 2008016653 A2 | 2/2008 |
| WO | 2010103449 A1 | 9/2010 |
| WO | 2012014091 A1 | 2/2012 |
| WO | 2012042396 A1 | 4/2012 |
| WO | 2013007386 A1 | 1/2013 |

OTHER PUBLICATIONS

German Patent No. 102007038087 (A1); Publication Date: Feb. 12, 2009; Abstract Only; 1 Page.
European Patent No. 1369309 (A1); Publication Date: Dec. 10, 2003; English Machine Translation; 13 pages.
European Patent No. 1473197 (A1); Publication Date: Nov. 3, 2004; Abstract Only; 1 Page.
European Patent No. 1759959 (A2); Publication Date: Mar. 7, 2007; Abstract Only; 1 Page.
European Patent No. 1759959 (A2); Publication Date: Mar. 7, 2007; Machine Translation; 18 Pages.
Japanese Patent No. 2006247237 (A); Date of Publication: Sep. 21, 2006, Abstract Only; 1 Page.
U.S. Appl. No. 12/974,184, filed Dec. 20, 2010; "Reinforced Body in White and Method of Making and the Using the Same".
European Patent No. 0661198 (A1); Publication Date: Jul. 5, 1995; Abstract Only; 2 Pages.
German Patent No. 102011104368 (A1); Publication Date: Mar. 15, 2012; Abstract Only; 1 Page.
European Patent No. 1419936 (A1); Publication Date: May 19, 2004; Abstract Only; 1 Page.
European Patent No. 1652733 (A1); Publication Date: May 3, 2006; Abstract Only; 1 Page.
International Publication No. 2005100100 (A1); Publication Date: Oct. 27, 2005; Abstract Only; 1 Page.
International Publication No. 2006136743 (A1); Publication Date: Dec. 28, 2006; Abstract Only; 2 Pages.
International Publication No. 2013007386 (A1); Publication Date: Jan. 17, 2013; Abstract Only; 1 Page.
European Patent No. 2380782 (A1); Publication Date: Oct. 26, 2011; Abstract Only; 2 Pages.
French Patent No. 2702432 (A1); Publication Date: Sep. 16, 1994; Abstract Only; 1 Page.
French Patent No. 2859970 (A1); Publication Date: Mar. 25, 2005; Abstract Only; 1 Page.
French Patent No. 2864811 (A1); Publication Date: Jul. 8, 2005; Abstract Only; 1 Page.
French Patent No. 2887508 (A1); Publication Date: Dec. 29, 2006; Abstract Only; 1 Page.
International Search Report; International Application No. PCT/US2014/011804; International Filing Date: Jan. 16, 2014; Date of Mailing: Apr. 24, 2014; 6 Pages.
Written Opinion of the International Searching Authority; International Application No. PCT/US2014/011804; International Filing Date: Jan. 16, 2014; Date of Mailing: Apr. 24, 2014; 6 Pages.
U.S. Appl. No. 13/745,180; filed Oct. 18, 2013; "Polymer, Energy Absorber Rail Extension, Methods of Making and Vehicles Using the Same"; Available in Image File Wrapper.
Witteman, Willibroordus J.; "Improved Vehicle Crashworthiness Design by Control of the Energy Absorption of Different Collision Situations"; Dictoral Dissertation, Eindhoven University of Technology; 1999; 191 Pages.

* cited by examiner

US 8,864,216 B2

REINFORCED BODY IN WHITE AND METHOD OF MAKING AND USING THE SAME

BACKGROUND

The present disclosure relates to the structural body of a vehicle and to weight reduction thereof.

Automotive manufacturers are continuing to reduce the weight of passenger cars to meet the increasing government regulations on fuel efficiency and reducing emissions. The structural body of a vehicle, commonly known as the body-in-white (BIW), is a vehicle's largest structure, and therefore ideal for weight reduction considerations. Body-in-white refers to the welded sheet metal components which form the vehicles structure to which the other components will be married, i.e., the engine, the chassis, the exterior and interior trim, the seats, etc. Reducing body weight, however, involves a trade-off with body stiffness, a key characteristic which influences vehicle dynamics, durability, and crash worthiness.

This generates the need to design a BIW having reduced weight, without sacrificing durability and crash worthiness.

BRIEF DESCRIPTION

Disclosed, in various embodiments are plastic-metal hybrid reinforced structural elements of a vehicle body as well as methods of making and using the reinforced body.

In various embodiments, a structural body of a vehicle comprises: a hollow metal component comprising walls that define a channel, wherein the metal component has a metal component length, and wherein the metal component is selected from the group consisting of beam, rail, pillar, chassis, floor rocker, and cross-bar, and combinations comprising at least one of the foregoing; and a plastic-metal hybrid reinforcement having a plastic honeycomb structure, and a metal support having greater than or equal to 3 walls forming a support channel. The plastic element is located in the support channel wherein the reinforcement is located in the component channel.

In one embodiment, a vehicle comprises: structural body, an engine, and a drive mechanism. The structural body comprises: a hollow vehicle component comprising walls that define a channel, wherein the vehicle component has a vehicle component length, and wherein the vehicle component is selected from the group consisting of beam, rail, pillar, chassis, floor rocker, and cross-bar, and combinations comprising at least one of the foregoing; and a plastic-metal hybrid reinforcement having a plastic honeycomb structure, and a metal support having greater than or equal to 3 walls forming a support channel. The plastic element is located in the support channel and the reinforcement is located in the component channel.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
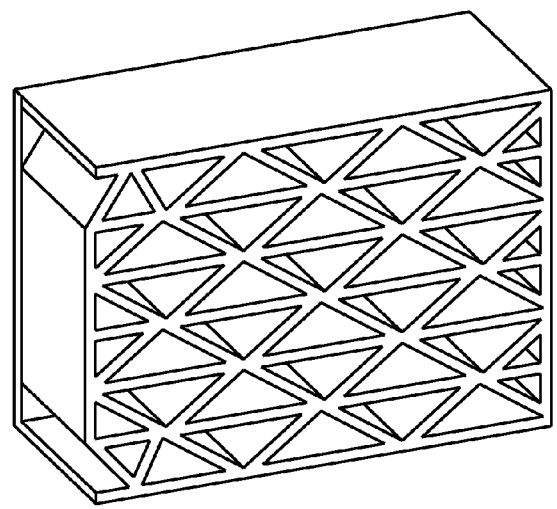
FIGS. 1-3 are perspective views of various exemplary embodiments of plastic element of the hybrid reinforcement that can be employed in the BIW.

As mentioned above, it is desirable to reduce the weight of a vehicle without compromising structural integrity and durability. Therefore, it is desirable to reduce the amount of metal employed in the vehicle while not sacrificing strength. Employed throughout the vehicle are hollow metal structural elements (e.g., beams, rails, pillars, rockers, bars, and so forth). The wall thickness of these various elements is sufficient to impart the desired structural integrity to that element to meet its desired function and various regulatory requirements. It has been discovered that the thickness of the wall can be reduced, thereby reducing the weight of the component and hence the vehicle, while retaining the structural integrity of the element by using localized reinforcement in the component. Disclosed herein, in various embodiments, is a reinforced structural body of a vehicle, e.g., reinforced hollow metal parts of a motor vehicle. The disclosed energy-absorbing device is a hybrid metal-plastic solution. The device is a deformable unit comprising a metal support with plastic reinforcement, wherein the device can be used in hollow structural elements of a vehicle body (e.g., localized reinforcement). Essentially, localized plastic honeycomb-metal support reinforcement can be used to provide structural integrity to the hollow metal component of the vehicle (e.g., in the B-pillar).

For high-speed front crash (e.g., a speed of greater than or equal to 29 kilometers per hour (kmph)), front portion of the vehicle chassis (e.g., bumper beam, energy absorber, and rails), absorbs maximum amount of impact energy. For high-speed side crashes B-pillar, floor rocker, and floor crossbars play key role in energy absorption. For rollover or roof-crush the A-pillar, B-pillar, and roof rails play key role in impact energy absorption. Generally above-mentioned components are hollow metal sections. To improve the crashworthiness of above-mentioned components of vehicle, a hybrid metal polymer solution, comprising channels with localized metal supported polymer reinforcement is disclosed herein. The disclosed crush countermeasure provides impact resistance and/or reinforcement characteristics in a lighter weight structure as compared to prior systems composed entirely of metal. The crush countermeasure provides a lightweight crush system having comparable protection to current all metal systems. As such, the overall weight of a vehicle is reduced without any compromise on the safety considerations to passengers.

Disclosed are metal-plastic reinforcement in structural components, which can be used to minimize damage suffered during an impact. The metal-plastic (e.g., thermoplastic) reinforcement comprises a metal support with a plastic reinforcement inseparable from the metal support, wherein the reinforcement is located in a structural component (e.g., an element of a structural body of a vehicle). As used herein, "inseparable" refers to an inability to separate the components without damage to one or both of the components. The reinforcement can be located throughout the structural component, or in strategic locations within the structural component ("localized"). Elements of the structural body that can be reinforced include the beam(s), rail(s), pillar(s), chassis, floor rocker, and cross-bar(s), and other hollow metal components, as well as combinations comprising at least one of the foregoing The element can have a honeycomb structure, e.g., an array of columns and channels. The combs of the structure can be a shape having greater than or equal to 5 sides, such as pentagonal, hexagonal, heptagonal, and octagonal, and so forth, geometries, as well as combinations comprising at least one of the foregoing geometries, and specifically a hexagonal geometry. Optionally, rib(s) can be disposed within individual combs. Plastic honeycombs can be made by bonding extruded plastic tubes together, injection molding the plastic honeycombs, extruding the honeycomb structure, or otherwise formed. For example, the element can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different plastic for particular combs, or a combination comprising at least one of the foregoing. One possible fill material is foam.

The plastic reinforcement can comprise various plastic materials, e.g., thermoplastic, thermoset and combinations thereof. The particular material can be chosen based upon its properties, the desired location in the vehicle, and the characteristics of that location. For example, in some embodiments, the material can have moderate stiffness (e.g., Young's modulus of 0.8 gigaPascals (GPa) to 7.0 GPa), good elongation (e.g., greater than 30% elongation), chemical resistance and/or heat resistance under vehicle manufacturing conditions (e.g., welding, painting, etc., for example, at temperatures 400° F. for 30 minutes, which enables the plastic insert to maintain integrity as the part travels with the auto body through paint bake). Exemplary plastic materials include thermoplastic materials as well as combinations of thermoplastic materials with metal, elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the plastic component can comprise Noryl™ GTX resin, which is commercially available from SABIC. The plastic can optionally be reinforced, e.g., with fibers, particles, flakes, as well as combinations comprising at least one of the foregoing. These fibers may include glass, carbon, bamboo etc., as well as combinations comprising at least one of the foregoing. For example, the plastic insert can be formed from STAMAX™ materials, a long glass fiber reinforced polypropylene commercially available from SABIC. The plastic component can also be made from combinations comprising at least one of any of the above-described materials and/or reinforcements, e.g., a combination with a thermoset material.

The metal support can form a channel defined by greater than or equal to 3 sides. Each wall of the channel can be straight or corrugated. For example, a back wall can be straight (i.e., without corrugations or bends), wherein one or both of the side walls extending from the back wall in the same direction, can be corrugated. In other words, the side wall(s) can have indented areas (grooves). These indented areas can form a wave pattern, thereby forming the corrugation. Optionally, in the groove area of the side wall can be an opening though the wall such that, when the reinforcement is formed, molten plastic can pass from within the cavity, through the opening, and solidify to form the inseparable reinforcement. The depression created by corrugations in the outside face of metal support, also provides space for plastic coming out from two holes to settle therein the outer surface of metal support.

The specific size and design of the corrugations can be dependent upon the desired structural integrity desired from the metal component. The corrugations can, for example, be up to 20 millimeters (mm) deep (e.g., 0.5 to 20 mm), specifically, 1 mm to 10 mm, and more specifically, 2 mm to 7 mm (e.g., 5 mm). Deeper corrugations result in higher stiffness but also increase the sheet metal stamping challenges. The depth of corrugation may vary from base to the free edge side, e.g., increasing from the base to the free side, such as from 1 mm to 10 mm, specifically, 3 mm to 7 mm. This variation can reduce the wrinkling of steel at corrugation base location during steel stamping operations.

The number of holes through the corrugations can be greater than or equal to one, specifically greater than or equal to two, e.g., 2 to 4 holes, for ease of plastic flow inside out. The hole diameter (along a major axis) can be up to 20 mm (e.g., 0.5 mm to 20 mm), specifically, 1 mm to 10 mm, and more specifically, 2 mm to 7 mm (e.g., 5 mm).

The metal support can comprise various metals based upon structural integrity, weight, and weldability. Some possible metals for the metal support include aluminum, steel, titanium, chrome, magnesium, and zinc, as well as combinations comprising at least one of the foregoing materials.

Figure 18:
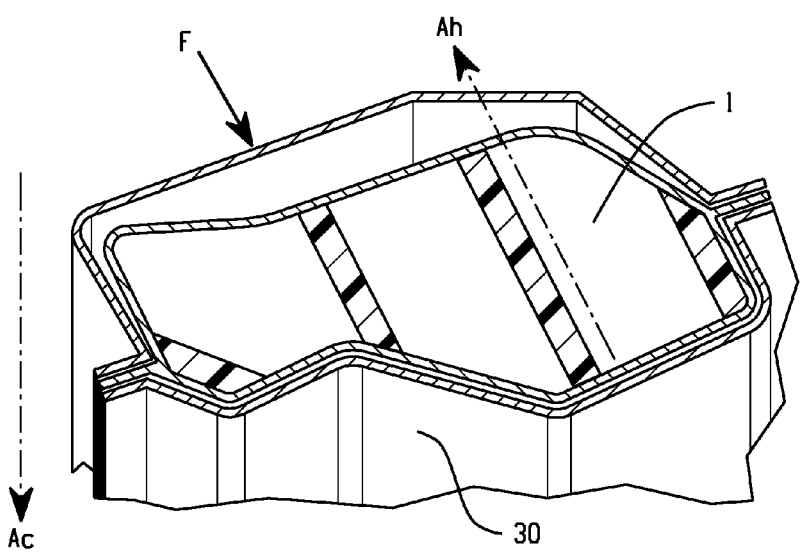
FIG. 18 is a cross-sectional view taken along lines B-B of FIG. 17 showing a cross-section of the B-pillar, and reinforcement therein.

The honeycombs' orientation with respect to the channel in the support (and also with respect to the opening through the structural element) can also be adjusted to tune the energy absorption characteristics of the reinforced structural component (e.g., BIW). For example, the honeycomb can form channels that can be oriented 0 degrees (e.g., parallel) to 90 degrees (perpendicular), to the major axis of the support. The major axis is the axis extending down the channel (e.g., see FIG. 18 axis Ax). In other words, in some embodiments, the honeycombs can have a common main axis with the channel and extend parallel thereto. In other embodiments, the honeycombs can extend perpendicular to the main axis of the channel. Consequently, when the reinforcement is disposed in the structural component, in some embodiments, the honeycombs can have a common main axis with the opening through the structural component, while in other embodiments, the honeycombs can extend perpendicular to the opening through the structural component.

The overall size of the reinforcement will be depending upon its location within the BIW and the size of the associated opening in the structural component. Furthermore, the characteristics of the reinforcement will depend upon the energy absorption characteristics desired in the particular area, e.g., the number of combs per unit area, the thickness of the comb walls, and the specific material of the plastic reinforcement. The density of combs (number of combs per unit area) is dependent upon the desired stiffness, crush characteristics, and materials employed. In some embodiments, the density can be 1 to 20 combs per 100 mm$^2$, specifically, 1 to 10 combs per 100 mm$^2$, and more specifically 1 to 5 combs per 100 mm$^2$. In various embodiments, the thickness of the walls of the plastic reinforcement can be 0.5 mm to 10 mm, specifically, 2 mm to 5 mm, and more specifically 2.5 mm to 4 mm. Generally, a reinforcement will comprise greater than or equal to 10 combs, specifically, greater than or equal to 20 combs, and more specifically, greater than or equal to 30 combs.

The length of the metal component is dependent upon the particular area of the BIW, while the length of the plastic reinforcement is dependent upon the amount and location of enhanced structural integrity in the metal component. The plastic reinforcement can have a length commensurate with the length of the metal component or less than the length of the metal component (e.g., can be localized; i.e., disposed only in a specific location to attain enhanced structural integrity of that location). Desirably, to maximize the weight reduction, the plastic reinforcement is localized so as to add the minimum amount of weight needed to attain a desired structural integrity (e.g., a structural integrity that this greater than or equal to the standard metal component without the thinner walls). The reinforcement can have a length of less than or equal to 1,000 mm, specifically, less than or equal to 800 mm, and more specifically, less than or equal to 300 mm. The length of the reinforcement can be less than or equal to 80% of the length of the structural component, specifically, less than or equal to 60%, more specifically, less than or equal to 50%, and yet more specifically, 10% to 35% of the length of the structural component (i.e., the structural component that is reinforced by the reinforcement). For example, the reinforcement can have a length of 150 mm to 350 mm, specifically, 200 mm to 250 mm, such as for use in a pillar or rail. In other embodiments, the plastic reinforcement has a length of 500 mm to 800 mm, specifically, 600 mm to 700 mm, such as for use in a floor rocker. The structural component is a hollow metal element. The reinforcement is disposed in the hollow space. When the reinforcement is not located throughout the hollow space in the structural element, it can be attached to the structural element to inhibit the reinforcement from being dislodged during use of the vehicle or during an impact.

Some possible structural component material(s) include aluminum, titanium, chrome, magnesium, zinc, and steel, as well as combinations comprising at least one of the foregoing materials. The thickness of the walls of the structural component can all be the same or can be different to enhance stiffness in a desired direction. For example, one set of opposing walls can have a greater/lesser thickness than the other set of opposing walls. In some embodiments, the structural components have a wall thickness of less than or equal to 1.6 mm, specifically, 1.0 mm to 1.5 mm, and more specifically 1.3 mm to 1.4 mm. Generally, metal walls (e.g., floor rocker, rails, pillars, bumper beam, and so forth), have a wall thickness of greater than 1.8 mm. Therefore, the use of the reinforcement enables a reduction in wall thickness (of the structural component) of greater than or equal to 10%, specifically, greater than or equal to 20%, and even greater than or equal to 25%.

As noted above, the reinforcement can be located in various areas of the vehicle, such as in the bumper beam(s) and/or the BIW (such as rail(s), pillar(s), chassis, floor rocker, and cross-bar(s)), as well as combinations comprising at least one of the foregoing. The desired specific location of the reinforcement in the structural component can be determined using crash results. For example, referring to FIG. 10, it can be seen that reinforcement is desired in the B-pillar (e.g., near the center of the B-pillar) and/or in the floor rocker where it meets the B-Pillar. (See exemplary reinforcement locations 70 in FIG. 9.)

A more complete understanding of the components, processes, and apparatuses disclosed herein can be obtained by reference to the accompanying drawings. These FIGS. (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The fixing measures can be mechanical and/or chemical. Exemplary mechanical fixing measures include locking element(s) (such as plastic (e.g., plastic extruded through an opening in the wall connecting the plastic reinforcement to the outside surface of the BIW component)), snaps, hooks, screws, bolts, rivets, welds, crimp(s) (e.g., the crimped metal wall), metal protrusions from the structural component wall to and/or into the reinforcement (such as tabs or the like extending from the wall(s) into the channel to engage the reinforcement), and the like. The metal support of hybrid reinforcement can, for example, be welded to the metal channel of BIW. A friction fit can also be used to maintain the reinforcement in place. Chemical fixing measures can include bonding agents such as glues, adhesives, and so forth.

In another embodiment, the reinforcement can be inserted into the metal reinforcement in a direction that allows metal tabs to cantilever outward and spring back into place to engage the reinforcement, inhibiting the removal thereof (e.g., to engage a groove). Optionally, the reinforcement can comprise an engagement area (e.g., divot, indentation, hole, or the like) configured to engage the tab and further inhibit the separation of the structural component and reinforcement. In some embodiments, the structural component can have a decreased size before and/or after the reinforcement such that the reinforcement cannot be moved (e.g., the reinforcement can be inserted into the structural component and the component can be crimped adjacent the reinforcement to inhibit the subsequent removal or movement of the reinforcement).

Figure 2:
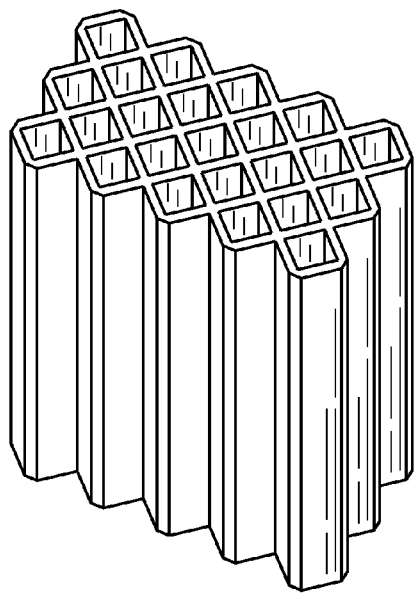
Figure 3:
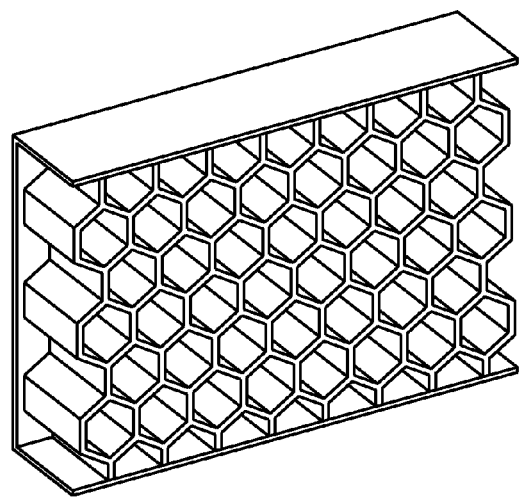

FIGS. 1-3 illustrate exemplary designs of the plastic element, including some exemplary shapes for the combs thereof. Some exemplary designs for the plastic element include a layered structure comprising a plurality of layers of triangular structures (e.g., layers with diagonal ribs forming triangles; e.g., FIG. 1), rounded comb structures (e.g., circular, oval, and so forth), polygonal comb structures (e.g., a hexagonal comb structure (e.g., FIG. 3), four sided comb structure (e.g., FIG. 2), pentagonal, and so forth), as well as combinations comprising at least one of the foregoing.

Figure 4:
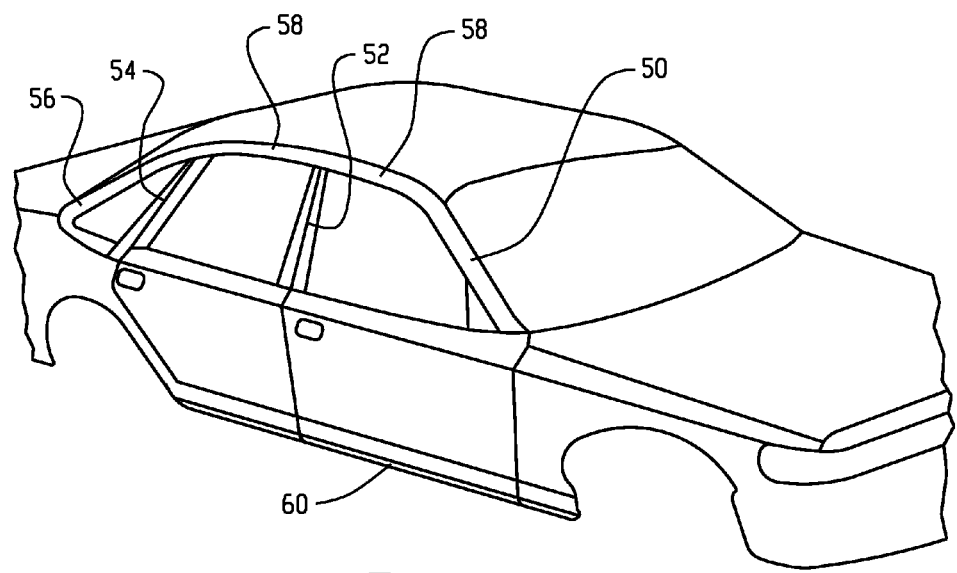
FIG. 4 is a partial perspective view of exemplary areas of the BIW that can be reinforced.

FIG. 4 is a pictorial representation of possible reinforcement locations in a vehicle. Here, the plastic inserts can be located in one or any combination of the identified locations. For example, A-Pillar 50 (e.g., near the center of the length of A-Pillar), B-Pillar 52 (e.g., near the center of the length of B-Pillar), C-Pillar 54 (e.g., near the center of the length of C-Pillar), D-Pillar 56 (e.g., near the center of D-Pillar), roof rail 58 (e.g., in multiple, separate locations along the length of the roof rail; such as centered over the window(s)), and/or floor rocker 60 (e.g., in the area where the B-Pillar meets the floor rocker). For example, inserts that occupy about 10% to 30% of the length of the metal component can be located in A-Pillar 50, B-Pillar 52, the roof rail 58, and the floor rocker 60. The correct location of these reinforcements depends on crash worthiness performance for different high-speed impact requirements. As is clear from the illustrations (e.g., FIGS. 1-3), the honeycombs form channels. The channels can be oriented parallel to the main axis of the hollow opening formed in the body in white component, orienting the channels perpendicular to the main axis of the hollow opening formed in the body in white component provides further structural integrity. (See FIGS. 7, 9, and 11.)

Figure 5:
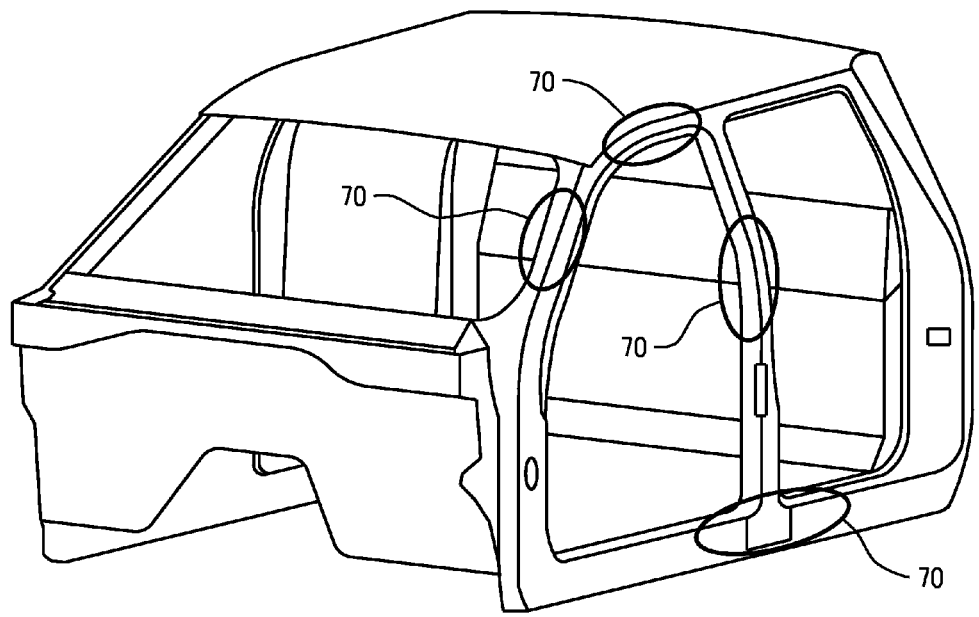
FIG. 5 is a pictorial representation of exemplary locations for the reinforcement.
Figure 6:
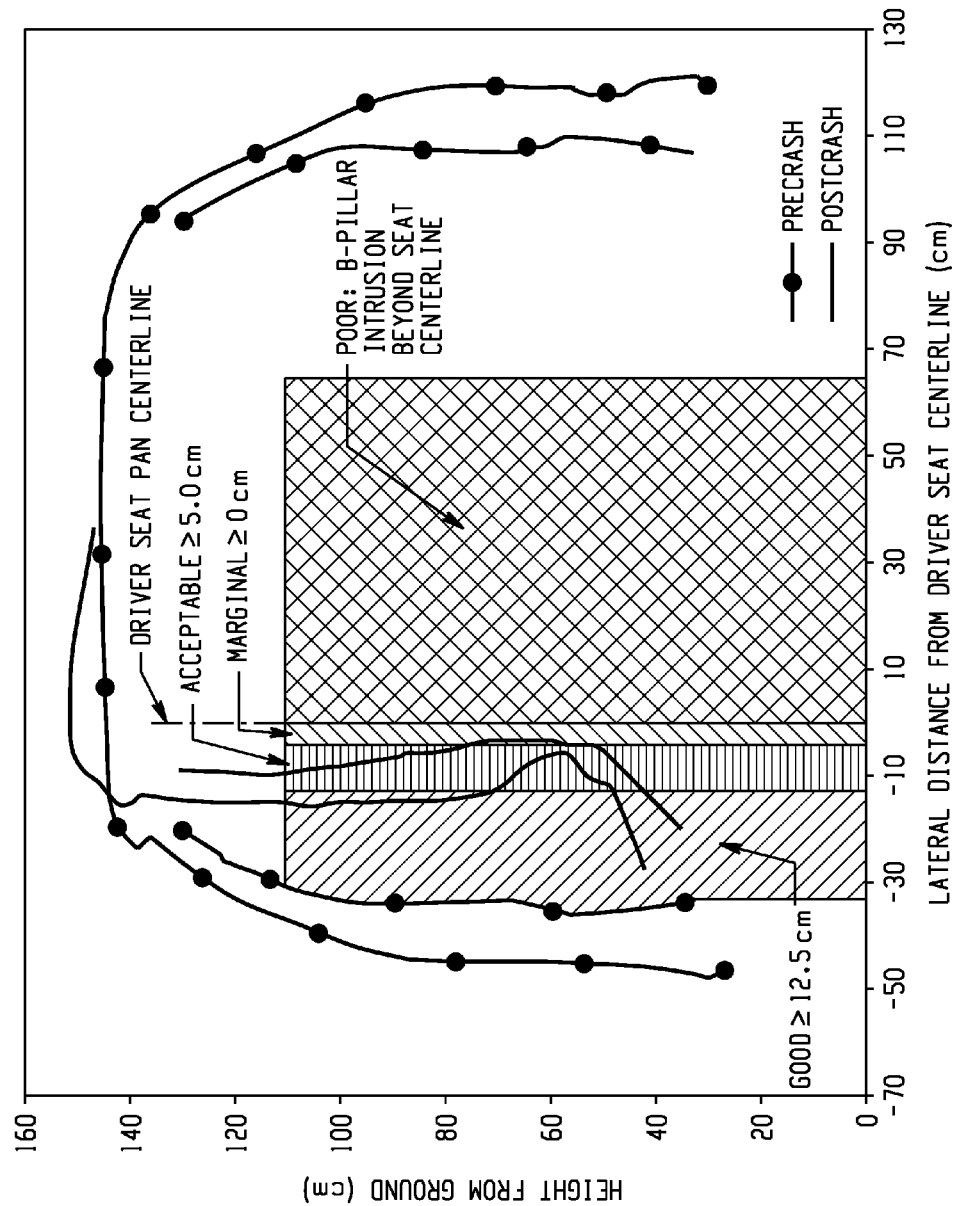
FIG. 6 is a graphical representation of crash result requirements for a BIW.

FIG. 5 is a pictorial representation of concept; in which localized reinforcements are proposed at identified locations of A-Pillar, B-Pillar, roof rail, and floor rocker and so forth. The cross-section details shown in FIG. 5 that two steel structures are welded together to from hollow component of the 'body in white' ("BIW"; also known as the body in black) and a reinforcement is placed in above-mentioned hollow space. The specific location of these reinforcements depends on crashworthiness performance for different high-speed impact requirements.

Figure 8:
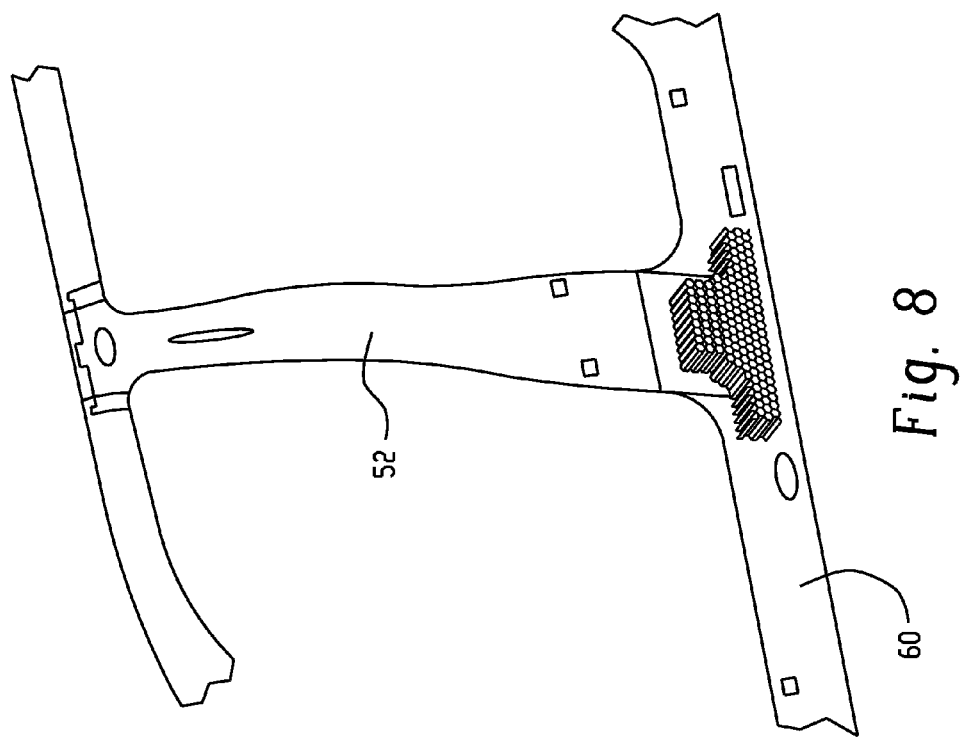
FIG. 8 is a perspective, exploded view of the plastic element of the hybrid reinforcement of FIG. 7.
Figure 7:
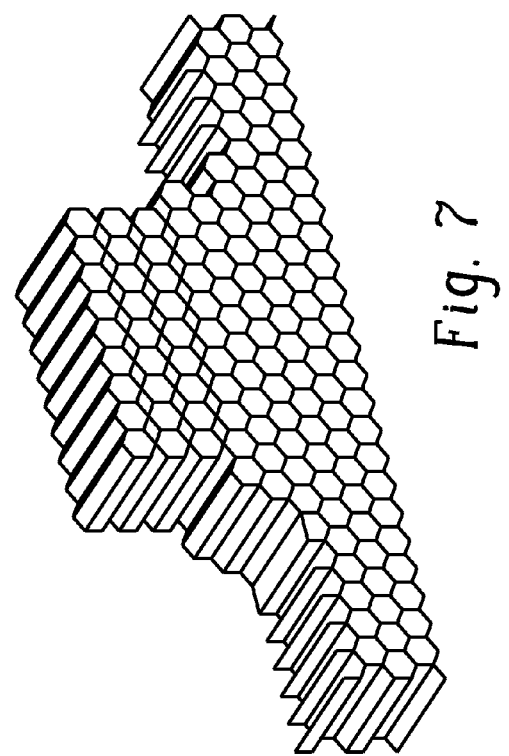
FIG. 7 is a perspective, schematic view of an embodiment of a plastic element of the hybrid reinforcement in the junction of B-pillar and the floor rocker.
Figure 10:
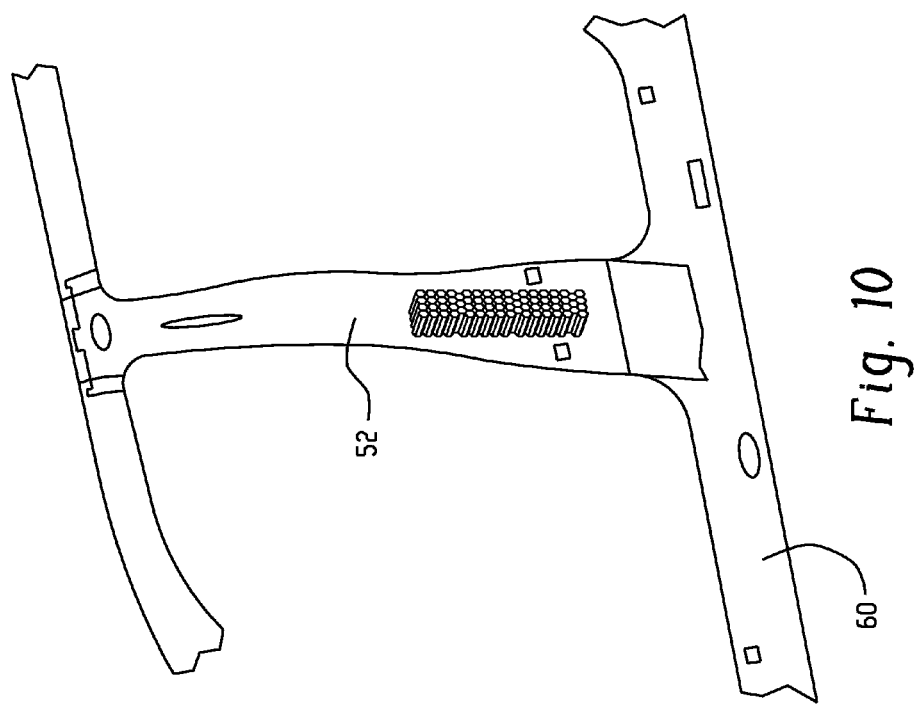
FIG. 10 is a perspective, exploded view of the plastic element of a hybrid reinforcement of FIG. 9.
Figure 9:
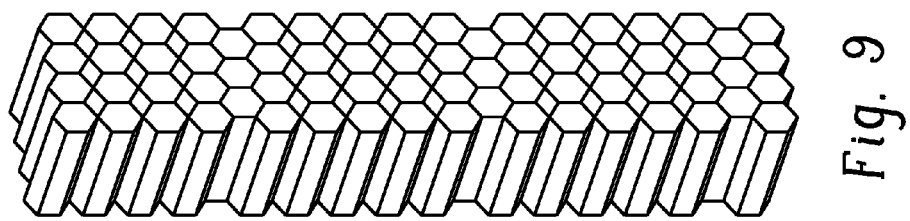
FIG. 9 is a perspective, schematic view of an embodiment of a plastic element of a hybrid reinforcement insert in B-pillar.
Figure 12:
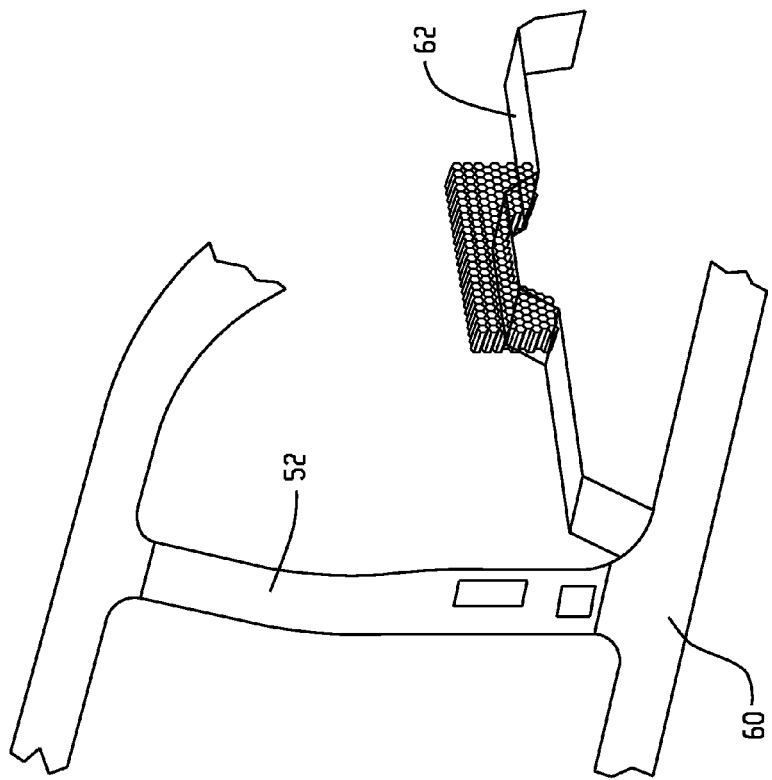
FIG. 12 is a perspective, exploded view of plastic element of a hybrid reinforcement of FIG. 11.
Figure 11:
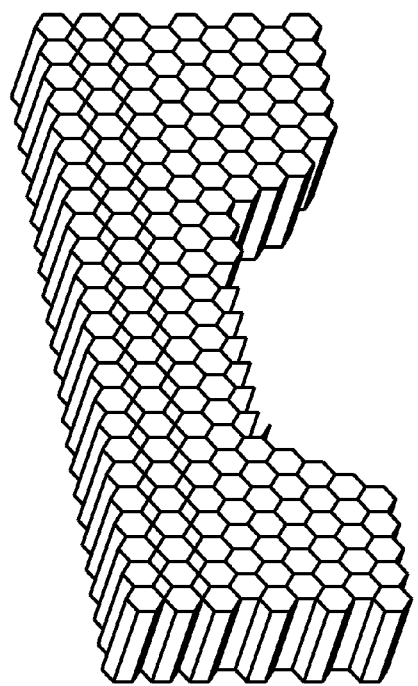
FIG. 11 is a perspective, schematic view of an embodiment of a plastic element of a hybrid reinforcement in the floor crossbar.

FIG. 7 illustrates the plastic element which can be incorporated at the junction of B-pillar 52 and the floor rocker 60. FIG. 9 illustrates the plastic element which can be incorporated at the B-pillar 52. FIG. 11 illustrates the plastic element which can be incorporated at the floor crossbar 62. FIGS. 8, 10, and 12 illustrate the plastic insert configuration the vehicle location for the inserts illustrated in FIGS. 7, 9, and 11, respectively.

The size of the honeycomb inserts varies with respect to the packaging available within the vehicle component. For example, the insert (FIG. 7) at floor rocker can be designed for and about 70 mm depth and covers about 400 mm×200 mm area at the T-junction of B-pillar 52 and the floor rocker 60 (FIG. 8); the honeycomb insert (FIG. 9) in the B-pillar can be designed for about 60 mm depth and covers an area of 60 mm×350 mm of B-pillar (FIG. 10); and/or the honeycomb insert (FIG. 11) for floor cross bar 62 can be designed for 80 mm depth and covers about 500 mm×90 mm area of the floor crossbar (FIG. 12).

Figure 13:
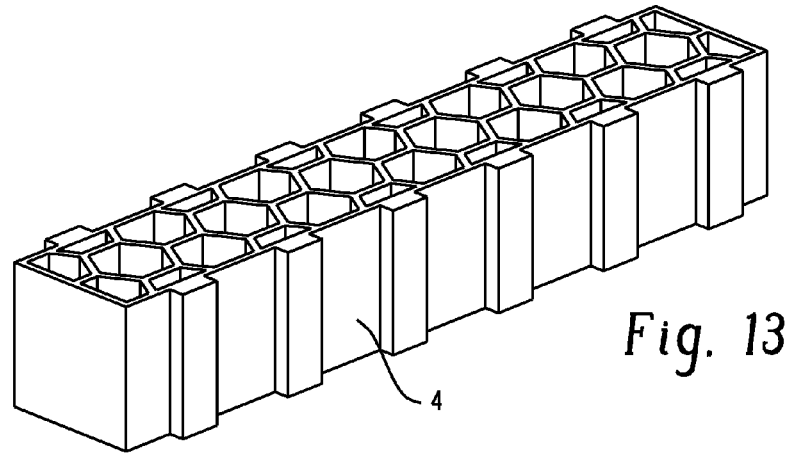
FIG. 13 is a perspective view of an embodiment of a plastic element of FIG. 14.
Figure 14:
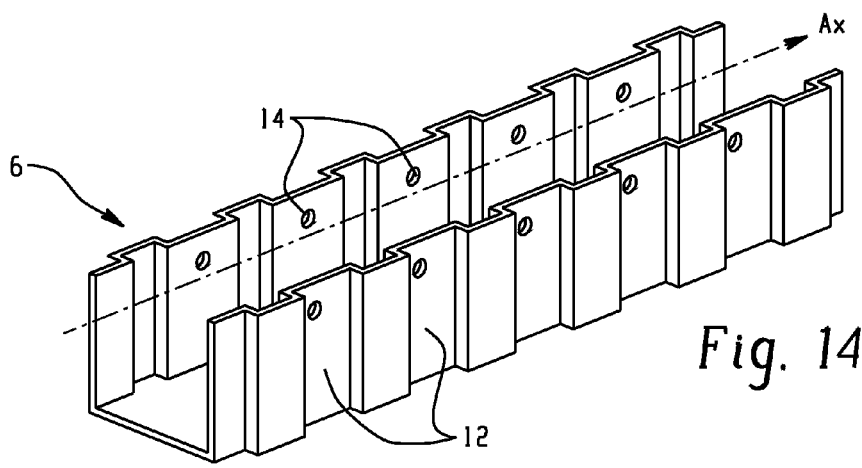
FIG. 14 is a perspective view of an embodiment of a metal support of FIG. 15.
Figure 15:
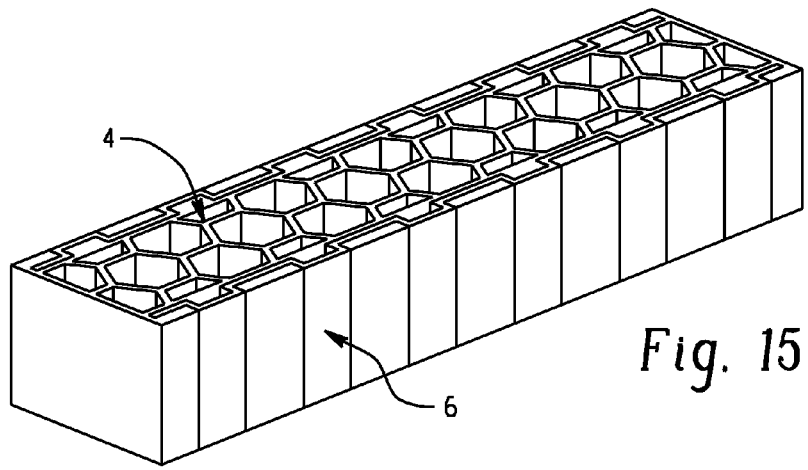
FIG. 15 is a perspective view of an embodiment of the plastic element of FIG. 13 located in the metal support of FIG. 14.

FIGS. 13-15 illustrate the elements of the reinforcement. FIG. 12 illustrates the plastic element 4 to be located within the channel of the metal support 6. As can be seen in FIG. 14, the metal support 6 can comprise openings 14, in the grooves 12 such that the plastic of the plastic element, can pass through the opening 14 and spread within the groove 12, thereby locking the metal support 6 and plastic element 4 together.

Figure 16:
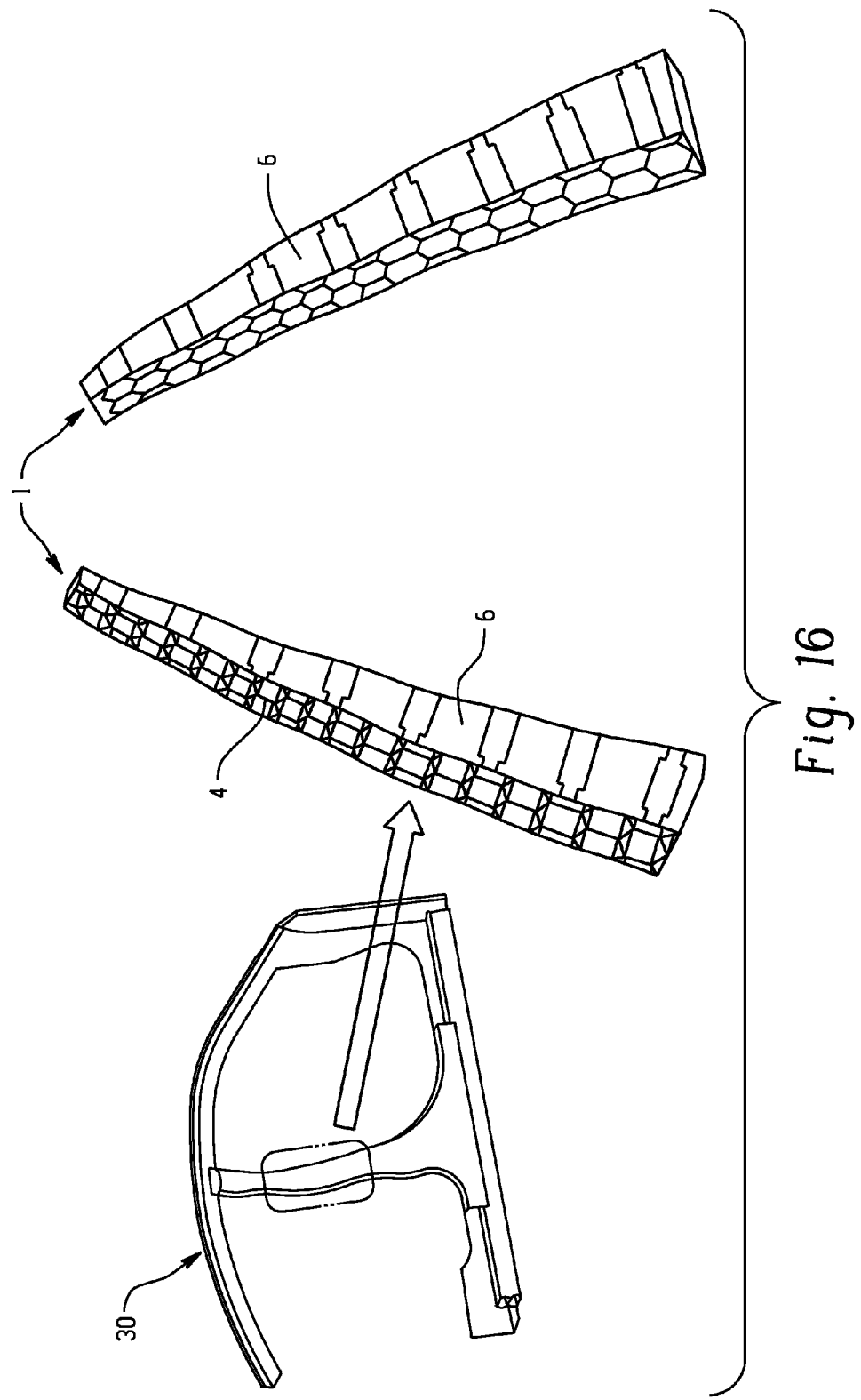
FIG. 16 is an illustration of an example of a reinforcement having an irregular, varied shape that is complimentary to the shape of the structural component where it will be located.
Figure 17:
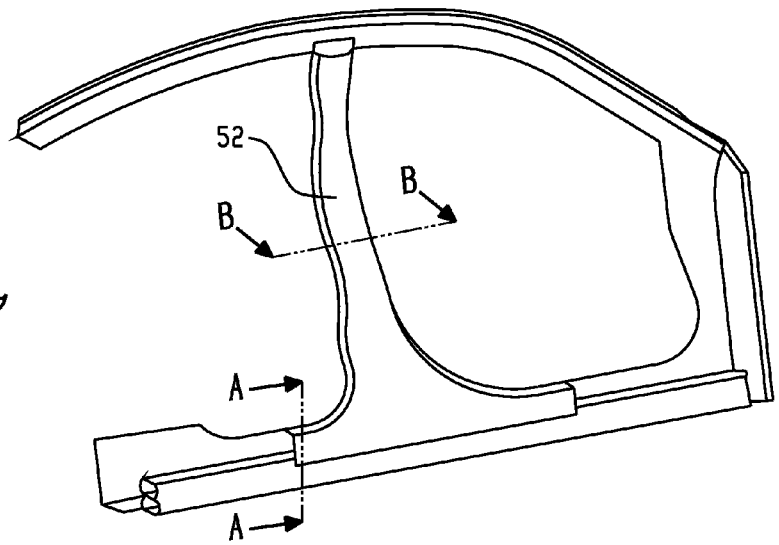
FIG. 17 is a front view of an example of structural components of a vehicle.
Figure 19:
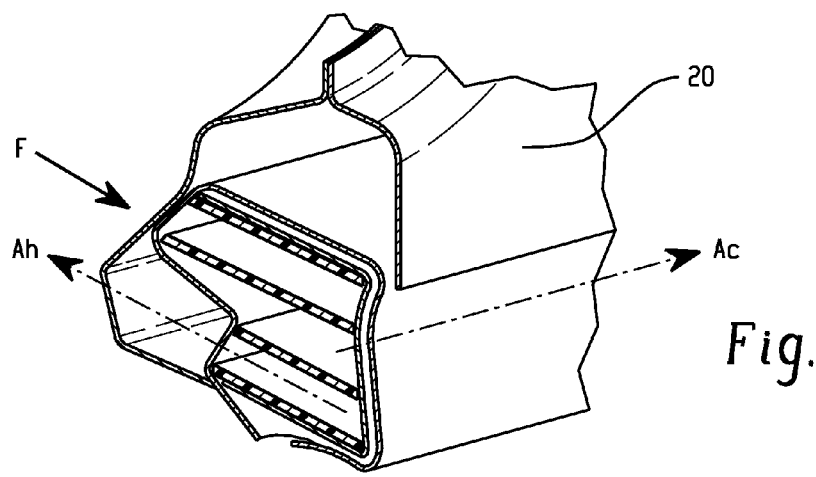
FIG. 19 is a cross-sectional view taken along lines A-A of FIG. 17 showing a cross-section of the floor rocker with reinforcement therein.

As is illustrated in FIG. 16, the reinforcement 1, can have a shape that is complimentary to the shape of the opening through the structural component 30. As can be seen in this figure, the plastic element 4 can have an axis Ah (see FIG. 18) along the depth of the comb. The depth of the comb can be constant throughout the reinforcement (see FIG. 15), or can vary along the length of the reinforcement (see FIG. 16), e.g., to follow the shape of the structural component 30 of the vehicle. For example, the depth of the combs of the plastic element 4 can decrease from one end of the reinforcement to an opposite end of the reinforcement, e.g., along axis Ax. This is further illustrated in FIGS. 17-19. In these figures, the cross-sectional view (B-B) of the B-pillar 52 (FIG. 18), and the cross sectional view (A-A) of the floor rocker (FIG. 19), are shown. In both FIGS. 18 and 19, the reinforcement 1 is shown such that the honeycomb channels (axis Ah) are perpendicular to the axis of the opening through the structural component 30 (axis Ac).

Figure 20:
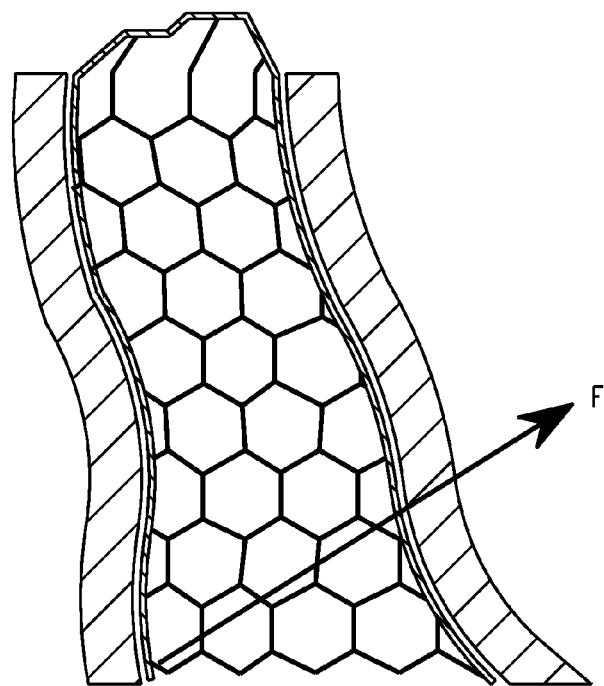
FIGS. 20 and 21 illustrate force directions impacting examples of reinforcements observed in the B-pillar and floor rocker, along direction Ah during a high speed side impact case.
Figure 21:
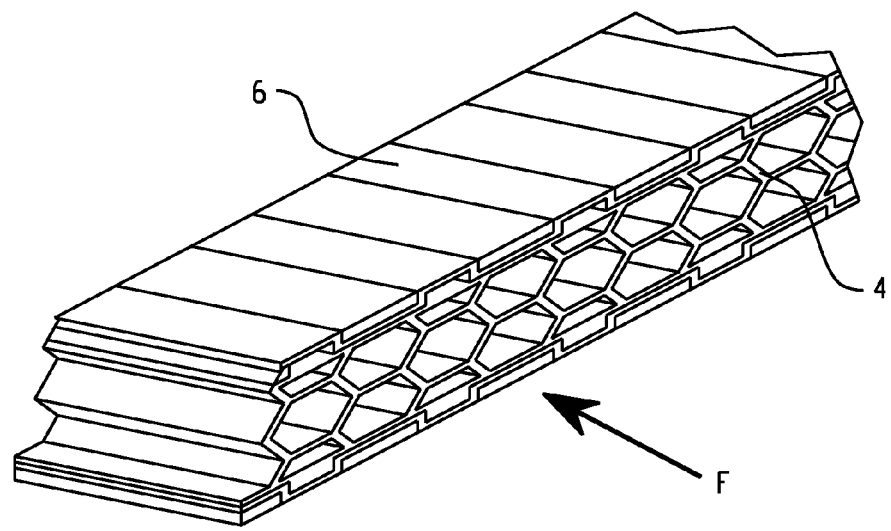

In addition to illustrating possible plastic element 4 orientation, these figures also illustrate exemplary force directions (arrow F) on these structural components. In FIGS. 20 and 21, the BIW component (e.g., steel channel) is illustrated as transparent to show the reinforcement therein and direction of loading along direction 'Ah' during high speed side crash scenario.

In some embodiments, the plastic reinforcement can be co-molded with the metal component and located in the cavity. This can be achieved by standard insert molding process.

Using hybrid reinforcement at different locations in BIW 15% to 30% improvement in the crash performance is expected compared to no plastic reinforcement for high-speed side crashes.

To retain the same structural integrity (crash performance) during high-speed side crashes, the reinforcement to BIW may help in greater than or equal to 10% reduction in weight of BIW compared to designs without plastic reinforcement, due to a reduction in the steel gauge (thickness) at different locations.

The use of localized reinforcement (e.g., plastic honeycomb structure having hollow channels therethrough, located in metal support structure) may enable the reduction in wall thickness of the reinforced component by greater than or equal to 15%, while retaining the structural integrity.

With foam filled components, a hollow part is filled with foam to its full volume, and the expanded foam material provides the connection to the wall and thus the absorption of force and distribution of load. The reinforcement characteristics are based on the material properties of the foam. However, foam reinforcement systems require a chemical reaction that must be adapted to the production process of the vehicle, particularly in terms of the incident temperatures. The reinforcement function thus depends on accurate and constant adherence to the process parameters. Another disadvantage is that the structural parts can no longer be disconnected from one another easily, making recycling more difficult. In addition, completely filling the space with foam brings about a more or less homogeneous reinforcement effect, without the ability to take three-dimensional varying design requirements into account.

In crush countermeasure systems that include steel stampings fixed to sheet metal via thermoset adhesive, the adhesive will activate and expand as the body goes through the ovens that bake the paint. Therefore, this system is not optimal. The stampings are heavy and excessive adhesive would generally need to be applied to assure a solid bond from the countermeasure to the body.

By uniting the structural component (e.g., any hollow, metal, load bearing component in the vehicle) and hybrid reinforcements as described herein, several advantages are realized: (i) the design is lighter compared to all metallic components, yet the same structural requirements are still met, (ii) the plastic reinforcements have a high stiffness by weight ratio compared to other reinforcements (e.g., compared to foam, expandable epoxy, and steel reinforcements), (iii) there is better thermal performance during paint cycle compared to foam or epoxy reinforcement solutions, and/or (iv) no changes are required in existing assembly line; e.g., the crush countermeasure can be manufactured and used in a motor vehicle without the use of additional processing steps. In addition, since the same structural integrity can be attained at a reduced weight, or better structural integrity can be attained at the same weight of standard, all steel structural components (e.g., BIW), this design is better suited to meet the carbon dioxide emission requirements due to be in effect by 2016, as well as meeting the safety requirements of the National Highway Traffic Safety Administration (NHTSA).

Embodiment 1

A structural body of a vehicle comprises: a hollow structural component comprising walls that define a component channel, wherein the vehicle component has a component length, and wherein the vehicle component is selected from the group consisting of bumper beam, rail, pillar, chassis, floor rocker, and cross-bar, combinations comprising at least one of the foregoing; and a reinforcement comprising a plastic element having a honeycomb structure, and a metal support having greater than or equal to 3 walls forming a support channel. The plastic element is located in the support channel and the reinforcement is located in the component channel.

Embodiment 2

The structural body of Embodiment 1, wherein the honeycombs are filled.

Embodiment 3

The structural body of any of Embodiments 1-2, wherein the plastic element comprises a thermoplastic.

Embodiment 4

The structural body of any of Embodiments 1-3, wherein the plastic element further comprises fiber reinforced thermoplastic.

Embodiment 5

The structural body of any of Embodiments 1-4, wherein the reinforcement has a reinforcement length that is less than or equal to 80% of the component length.

Embodiment 6

The structural body of any of Embodiments 1-5, wherein the reinforcement length is 10% to 35% of the component length.

Embodiment 7

The structural body of any of Embodiments 1-6, wherein the plastic element has a hollow honeycomb structure with a hexagonal comb geometry, and has a length of 150 mm to 350 mm.

Embodiment 8

The structural body of any of Embodiments 1-7, wherein the plastic element has a hollow honeycomb structure with a hexagonal comb geometry, and has a length of 500 mm to 800 mm.

Embodiment 9

The structural body of any of Embodiments 1-8, wherein the plastic element is attached to the structural component with mechanical fixing measures.

Embodiment 10

The structural body of any of Embodiments 1-9, wherein the structural component is a floor rocker.

Embodiment 11

The structural body of any of Embodiments 1-10, wherein the structural component is a bumper beam.

Embodiment 12

The structural body of any of Embodiments 1-11, wherein the structural component has a space having a major axis, and wherein the honeycomb structure comprises channels, and wherein the channels are oriented perpendicular to the major axis.

Embodiment 13

The structural body of any of Embodiments 1-12, wherein the plastic element is inseparably attached to the metal support.

Embodiment 14

The structural body of any of Embodiments 1-13, wherein at least one of the walls of the metal support has grooves and holes through the walls in the grooves.

Embodiment 15

The structural body of Embodiment 14, wherein plastic from the plastic element is located through the holes and in the grooves.

Embodiment 16

The reinforcement of Embodiment 15, wherein the plastic fills the grooves forming a flat outer surface.

Embodiment 17

A vehicle, comprises: a structural component of any of Embodiments 1-16; an engine; and a drive mechanism.

Embodiment 18

The vehicle of Embodiment 17, wherein the structural component has a space having a major axis, and wherein the honeycomb structure comprises channels, and wherein the channels are oriented perpendicular to the major axis.

Embodiment 19

A reinforcement configured for insertion into a structural component of a vehicle, comprising: a plastic element having a honeycomb structure, and a metal support having greater than or equal to 3 walls forming a support channel. At least one of the walls of the metal support has grooves and holes through the walls in the grooves. Plastic from the plastic element extends through the holes and into the grooves. The plastic element is located in the support channel and is inseparably attached to the metal support.

Embodiment 20

The reinforcement of Embodiment 19, wherein the honeycombs are filled.

Embodiment 21

The reinforcement of any of Embodiments 19-20, wherein the plastic element comprises a thermoplastic.

Embodiment 22

The reinforcement of any of Embodiments 19-21, wherein the plastic element further comprises fiber reinforced thermoplastic.

Embodiment 23

The reinforcement of any of Embodiments 19-22, wherein the reinforcement has a reinforcement length that is less than or equal to 80% of the component length.

Embodiment 24

The reinforcement of any of Embodiments 19-23, wherein the reinforcement length is 10% to 35% of the component length.

Embodiment 25

The reinforcement of any of Embodiments 19-24, wherein the plastic element has a hollow honeycomb structure with a hexagonal comb geometry, and has a length of 150 mm to 350 mm.

Embodiment 26

The reinforcement of any of Embodiments 19-25, wherein the plastic element has a hollow honeycomb structure with a hexagonal comb geometry, and has a length of 500 mm to 800 mm.

Embodiment 27

The reinforcement of any of Embodiments 19-26, wherein the plastic element is attached to the structural component with mechanical fixing measures.

Embodiment 28

The reinforcement of any of Embodiments 19-27, wherein the structural component is a floor rocker.

Embodiment 29

The reinforcement of any of Embodiments 19-28, wherein the structural component is a bumper beam.

Embodiment 30

The reinforcement of any of Embodiments 19-29, wherein the structural component has a space having a major axis, and wherein the honeycomb structure comprises channels, and wherein the channels are oriented perpendicular to the major axis.

Embodiment 31

The reinforcement of any of Embodiments 19-30, wherein the plastic element is inseparably attached to the metal support.

Embodiment 32

The reinforcement of any of Embodiments 19-31, wherein at least one of the walls of the metal support has grooves and holes through the walls in the grooves.

Embodiment 33

The reinforcement of Embodiment 32, wherein plastic from the plastic element is located through the holes and in the grooves.

Embodiment 34

The reinforcement of Embodiment 33, wherein the plastic fills the grooves forming a flat outer surface.

Embodiment 35

The reinforcement of any of Embodiments 19-34, wherein the honeycomb structure has a density of 1 to 20 combs per 100 $mm^2$.

Embodiment 36

The reinforcement of any of Embodiments 19-35, wherein the honeycomb structure has a density of 1 to 10 combs per 100 $mm^2$.

Embodiment 37

The reinforcement of any of Embodiments 19-36, comprising greater than or equal to 10 combs in the honeycomb structure.

Embodiment 38

The reinforcement of any of Embodiments 19-37, comprising greater than or equal to 20 combs in the honeycomb structure.

Embodiment 39

The reinforcement of any of Embodiments 19-38, comprising greater than or equal to 30 combs in the honeycomb structure.

Embodiment 40

The reinforcement of any of Embodiments 19-39, wherein a depth of the combs (Ah) varies along an axis Ax.

Embodiment 41

The structural component of any of Embodiments 1-40, wherein the structural component is metal.

Embodiment 42

A structural body of a vehicle comprising the reinforcement of any of Embodiments 19-41.

Embodiment 43

A vehicle comprises: a structural body, the reinforcement of any of Embodiments 19-41 located in the structural component; an engine; and a drive mechanism.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A structural body of a vehicle, comprising:
   a hollow structural vehicle component comprising walls that define a component channel, wherein the vehicle component has a component length, and wherein the vehicle component is selected from the group consisting of bumper beam, rail, pillar, chassis, floor rocker, and cross-bar, combinations comprising at least one of the foregoing; and
   a reinforcement comprising a plastic element having a honeycomb structure, and a metal support having greater than or equal to 3 walls forming a support channel;
   wherein the plastic element is located in the support channel; and
   wherein the reinforcement is located in the component channel.

2. The structural body of claim 1, wherein the honeycombs are filled.

3. The structural body of claim 1, wherein the plastic element comprises a thermoplastic.

4. The structural body of claim 1, wherein the plastic element further comprises fiber reinforced thermoplastic.

5. The structural body of claim 1, wherein the reinforcement has a reinforcement length that is less than or equal to 80% of the component length.

6. The structural body of claim 1, wherein the reinforcement length is 10% to 35% of the component length.

7. The structural body of claim 1, wherein the plastic element has a hollow honeycomb structure with a hexagonal comb geometry, and has a length of 150 mm to 350 mm.

8. The structural body of claim 1, wherein the plastic element has a hollow honeycomb structure with a hexagonal comb geometry, and has a length of 500 mm to 800 mm.

9. The structural body of claim 1, wherein the plastic element is attached to the structural component with mechanical fixing measures.

10. The structural body of claim 1, wherein the structural component is a floor rocker.

11. The structural body of claim 1, wherein the structural component is a bumper beam.

12. The structural body of claim 1, wherein the structural component has a space having a major axis, and wherein the honeycomb structure comprises channels, and wherein the channels are oriented perpendicular to the major axis.

13. The structural body of claim 1, wherein the plastic element is inseparably attached to the metal support.

14. The structural body of claim 1, wherein at least one of the walls of the metal support has grooves and holes through the walls in the grooves.

15. The structural body of claim 14, wherein plastic from the plastic element is located through the holes and in the grooves.

16. A vehicle, comprising:
    a structural body comprising:
       a hollow structural component comprising walls that define a component channel, wherein the structural component has a component length, and wherein the structural component is selected from the group consisting of beam, rail, pillar, chassis, floor rocker, and cross-bar, combinations comprising at least one of the foregoing; and
       a reinforcement comprising a plastic element having a honeycomb structure, and a metal support having greater than or equal to 3 walls forming a support channel;

wherein the plastic element is located in the support channel; and wherein the reinforcement is located in the component channel;

an engine; and a drive mechanism.

17. The vehicle of claim 16, wherein the structural component has a space having a major axis, and wherein the honeycomb structure comprises channels, and wherein the channels are oriented perpendicular to the major axis.

18. A reinforcement configured for insertion into a structural component of a vehicle, comprising:

a plastic element having a honeycomb structure, and a metal support having greater than or equal to 3 walls forming a support channel;

wherein at least one of the walls of the metal support has grooves and holes through the walls in the grooves;

wherein plastic from the plastic element extends through the holes and into the grooves;

wherein the plastic element is located in the support channel and is inseparably attached to the metal support.

19. The reinforcement of claim 18, wherein the plastic fills the grooves forming a flat outer surface.

* * * * *